United States Patent
Choiniere

(10) Patent No.: US 11,300,383 B2
(45) Date of Patent: Apr. 12, 2022

(54) SAL SEEKER GLINT MANAGEMENT

(71) Applicant: BAE SYSTEMS Information and Electronic Systems Integration Inc., Nashua, NH (US)

(72) Inventor: Michael J. Choiniere, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 310 days.

(21) Appl. No.: 16/531,209

(22) Filed: Aug. 5, 2019

(65) Prior Publication Data

US 2021/0041209 A1 Feb. 11, 2021

(51) Int. Cl.
*F41G 7/22* (2006.01)
*G02B 27/14* (2006.01)

(52) U.S. Cl.
CPC ........... *F41G 7/226* (2013.01); *G02B 27/142* (2013.01)

(58) Field of Classification Search
CPC .............................. F41G 7/226; G02B 27/142
See application file for complete search history.

(56) References Cited

U.S. PATENT DOCUMENTS

| 7,786,418 B2 * | 8/2010 | Taylor ................... G01S 13/867 244/3.16 |
| 2008/0087761 A1 * | 4/2008 | Jenkins ................... F42B 15/01 244/3.16 |
| 2011/0176214 A1 * | 7/2011 | Eiane ................... F41G 7/2293 359/601 |
| 2012/0211591 A1 * | 8/2012 | Sandomirsky ........ F42C 13/023 244/3.16 |
| 2016/0004920 A1 | 1/2016 | Armstrong-Crews et al. |
| 2019/0154403 A1 | 5/2019 | Choiniere |

OTHER PUBLICATIONS

International Search Report, PCT/US20/46096, dated Apr. 23, 2021, 9 pages.

* cited by examiner

*Primary Examiner* — Marcus E Windrich
(74) *Attorney, Agent, or Firm* — KPIP Law, PLLC; Scott J. Asmus

(57) ABSTRACT

A guidance system for a projectile having a mid-body. The guidance system having a mid-body semi-active laser seeker. The seeker has an objective lens assembly and a sensor array that reads laser energy and transmits data to determine the direction of the laser energy. A glint management unit is connected to mid-body in such a manner that glint laser energy is prevented from passing to the objective lens assembly and sensor array so as to enhance determination of the location of the target.

13 Claims, 5 Drawing Sheets

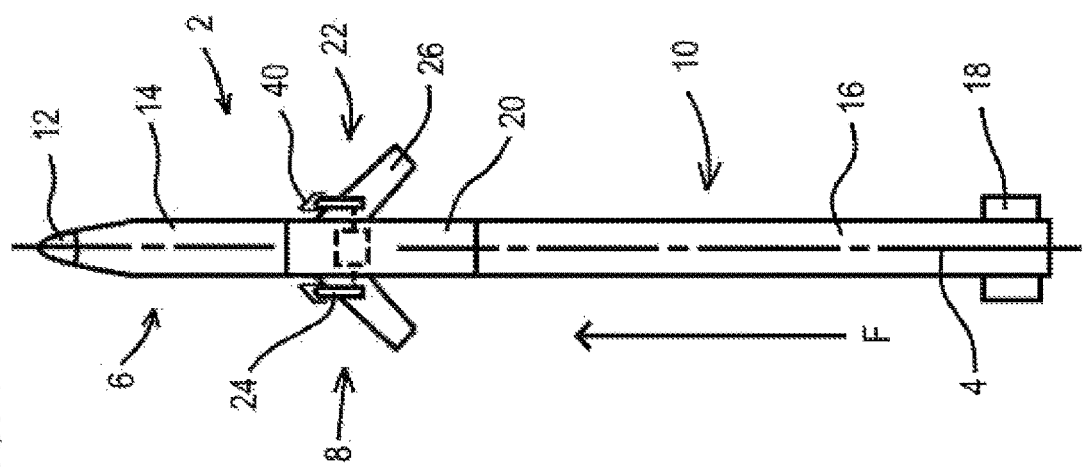
FIG. 1
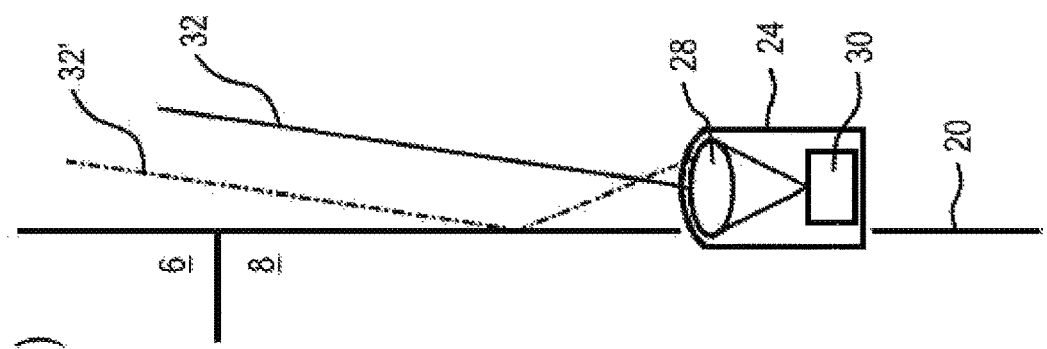
FIG. 2
(Prior Art)
FIG. 3

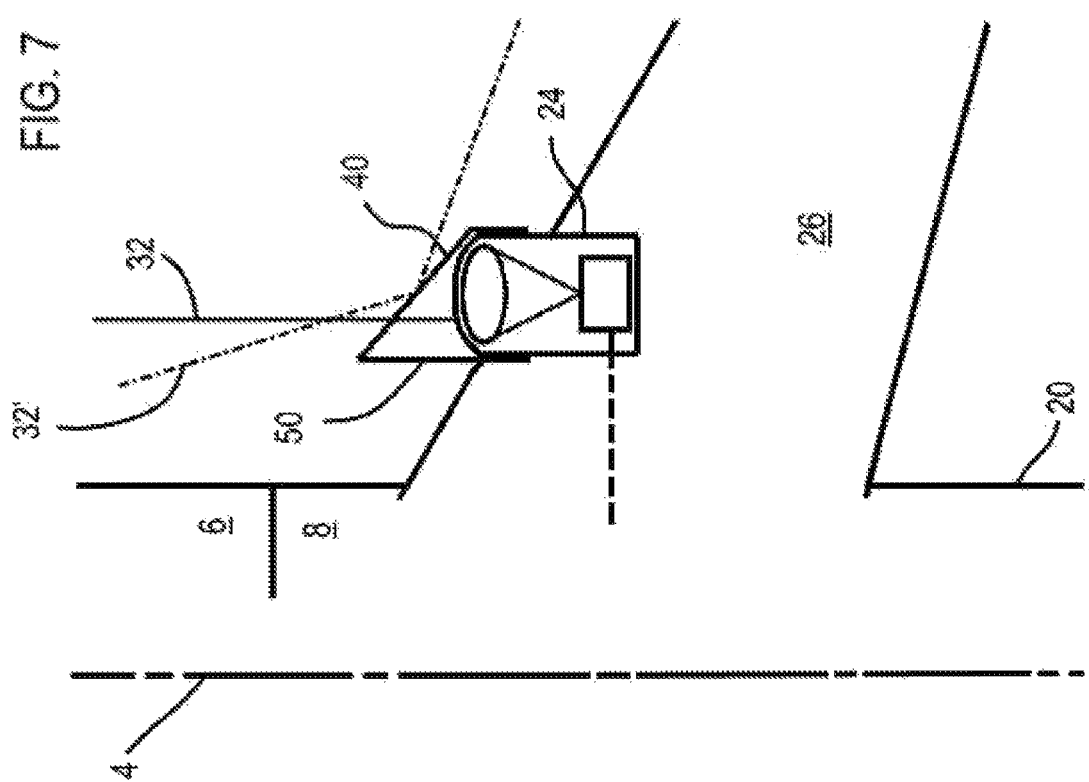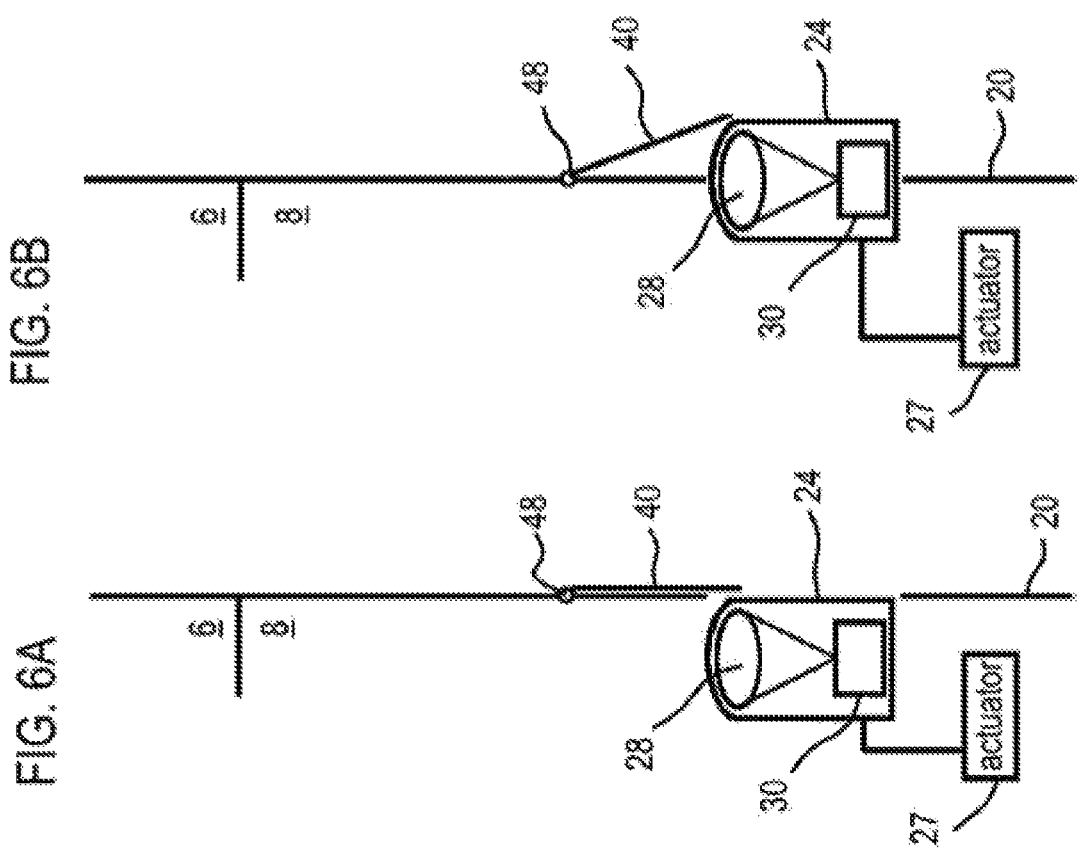

SAL SEEKER GLINT MANAGEMENT

FIELD OF THE DISCLOSURE

The present disclosure relates to a guidance system having glint management unit and more particularly to a guidance system having semi-active laser seeker and a glint management unit for enhancing the determination of a target location.

BACKGROUND OF THE DISCLOSURE

The use of guidance systems including Semi-Active Laser (SAL) seekers on weapons systems is known. Such guidance systems are used by military to guide an ordnance, missile, rocket or other projectile to a target by means of a SAL seeker. With this technique, a laser is pointed at a desired target using a laser target designator and the laser radiation bounces or rather reflects off the target and is scattered in all directions. This is often termed as "lighting up" a target. The projectile is then launched in a direction generally toward the target and when the projectile is close enough for some of the reflected laser energy from the target to reach it, a SAL seeker detects the reflected laser energy and helps to determine the direction from which this energy is coming. Based on this determination, the guidance system can adjust or correct the flight of the projectile, if necessary, so as to engage the target.

SAL seekers generally include a sensor array having different optics, e.g., spatial and temporal sensors which collect and read the reflected laser energy. The SAL seeker can be mounted on a front or mid-body of the projectile in such a manner that they have a forward facing Field of View (FOV). Arranging the SAL seeker along the outside of the projectile can enhance the collection of laser energy reflected off the target, however it can also introduce laser energy which corrupts the sensor readings.

Corruption of sensor readings can be caused when the sensor collects and reads laser energy which is not directly reflected off the target or that is to say in other words, when laser energy reflected off the target is re-reflected off a second object (warhead or munition) before being collected by the SAL seeker. Typically data from the laser energy read by the sensors of the SAL seeker can be used to determine a number of characteristics of the laser energy which, in turn, help determine the location of the target and guide the projectile to the target. However, collecting directly reflected laser energy as well as indirectly reflected laser energy causes a reduction in the accuracy of the determined location of the target. Although the directly reflected and the indirectly reflected laser energies will generally have the same characteristics such as the frequency, amplitude, wavelength, these laser energies will have two different directionalities. The differences in the directionalities of the directly reflected and the indirectly reflected laser energies corrupts the sensor readings and ultimately leads to inaccurate determination of the target location.

Wherefore it is an object of the present disclosure to overcome the above-mentioned shortcomings and drawbacks associated with the conventional weapons guidance systems having SAL seekers.

SUMMARY OF THE DISCLOSURE

An object of the disclosure is to provide a guidance system with a SAL seeker and having a glint management unit which reduces the amount of indirectly reflected laser energy that passes to the mid-body SAL seekers and thereby increases the accuracy of the determined location of the target. As used herein, glint refers to the indirect reflected laser energy Another object of the disclosure is to provide a guidance system for a projectile that has an objective lens assembly and a sensor array. The objective lens assembly is configured to capture and focus light energy on the sensor array, and the sensor array is configured to detect the light energy and transmit signals corresponding to the detected light energy. A flight control unit has a communication interface that is coupled to the sensor array for receiving the signals corresponding to the detected light energy. The flight control unit determines a directionality of the detected light energy based on the signal received by the sensor array. The directionality being understood as the direction from which the light energy impinges the objective lens assembly. A glint management unit is coaxially aligned in front of the objective lens assembly relative to a direction of flight of the projectile. The glint management unit extends laterally at a set angle relative to a longitudinal axis of the projectile such that glint light energy directed toward the objective lens assembly is deflected away from the objective lens assembly.

A further object of the present system is to provide a guidance system for a projectile with a mid-body SAL seeker having an objective lens assembly (optics) and at least one sensor (sensor array). The optics being configured to capture and focus light energy such as electromagnetic radiation, UV, visible, and/or IR light (laser energy) toward the sensor array. The sensor array can be a digital or analog array which is arranged axially behind the optics relative to a direction of flight F of the projectile and is configured to read the laser energy and transmit signals (laser data) corresponding to the laser energy to a processor of a flight control unit for determining a directionality of the laser energy. A glint management unit is connected to an outer surface of the projectile. The glint management unit is aligned circumferentially with the optics and arranged axially in front of the optics relative to the direction of flight F of the projectile. The glint management unit is angled relative to the longitudinal axis such that laser energy reflected off the target and subsequently reflected off a surface of the projectile toward the optics is reflected by the glint management unit away from the optics.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 1 is a diagrammatic view of an projectile having a guidance system with one configuration of a mid-body SAL seeker and glint management unit according to the description;

FIG. 2 is a diagrammatic view of a mid-body SAL seeker collecting laser energy as known in the art;

FIG. 3 is a diagrammatic view of a guidance system with another configuration of the mid-body SAL seeker and glint management unit according to the description collecting laser energy which is parallel to the projectile;

FIGS. 6A and 6B are diagrammatic views showing a configuration of the mid-body SAL seeker and glint management unit according to the description in a stowed and a deployed position;

FIG. 7 is a diagrammatic view of a guidance system with a mid-body SAL seeker and glint management unit mounted on a wing of an projectile;

DETAILED DESCRIPTION OF THE DISCLOSURE

Figure 5:
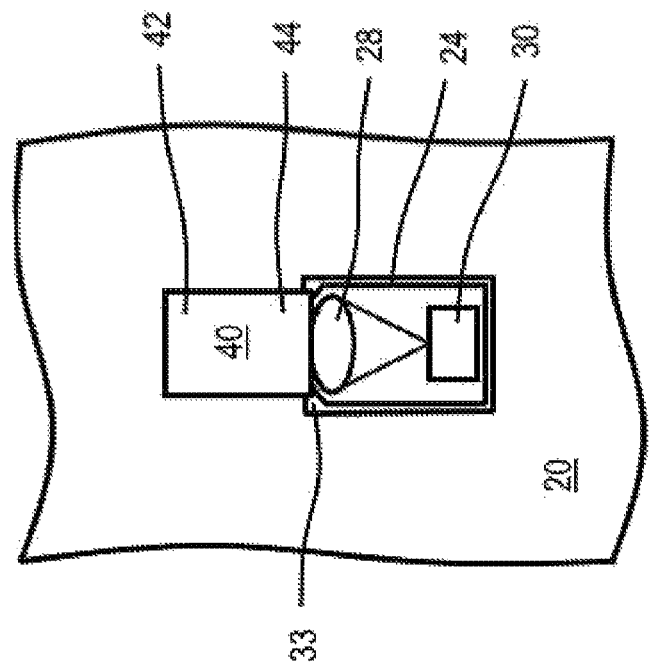
FIG. 5 is a diagrammatic lateral view of the mid-body SAL seeker and the glint management unit according to the description.

FIG. 1 diagrammatically illustrates an ordnance, missile, rocket, or projectile which is hereinafter simply referred to as a projectile 2. The projectile 2 has a substantially cylindrical body that defines a longitudinal axis 4 of the projectile 2. The longitudinal axis 4 generally corresponds to the direction of flight F of the projectile 2. The projectile 2 includes, in relation to its direction of flight F, a leading end 6, a mid-body 8 and a trailing end 10. The leading end 6 of the projectile 2 is partially in the form of an ogive or dome shape and typically comprises a fuse 12 and a warhead 14 while the trailing end 10 of the projectile 2 in some embodiments comprises a rocket motor 16 and has fins 18 which function to help stabilize the flight of the projectile 2. It is to be recognized that some projectiles are launched and do not contain a rocket motor 16 and glide to the target. In this example, the mid-body 8 of the projectile 2 has an axially extending cylindrical outer shell 20 which houses and supports a guidance system 22 that generally functions to control, adjust, or correct the trajectory or flight of the projectile 2 and guide it to a selected target. In one embodiment, the guidance system 22 includes one or more SAL seekers 24 that can be mounted on wings 26 of the mid-body 8. In one example the seekers are proximate the leading end 6. The wings 26 can be pivoted from a retracted position, in which the wings 26 are housed within the outer shell 20 of the mid-body 8, to a deployed position in which the wings 26 extend from the outer shell 20 of the mid-body 8 following launch of the projectile 2. In this embodiment the SAL seekers 24 are mounted on the wings 26, when the wings 26 are in the deployed position, the SAL seekers 24 are situated in the air stream adjacent the exterior surface of the outer shell 20 so as to have a generally forward facing FOV referring to the direction of flight F of the projectile 2. The guidance system 22 further includes glint management units 40 which are secured to the SAL seekers 24 and described in further detail below.

FIG. 2 shows a simplified diagrammatic sectional view of a portion of a known mid-body 8 having a SAL seeker 24 that includes an objective lens assembly 28 and a sensor array 30 and which collects the reflected laser energy 32, 32'. The SAL seeker 24 can be mounted along the outside of the mid-body 8 of the projectile 2 so as to have a generally forward facing FOV, referring to the direction of flight F of the projectile 2, which can enhance the collection of reflected laser energy 32, 32'. SAL seekers 22 of known guidance systems collect laser energy 32, 32' directed at its optics 28 regardless of the source or rather the direction from which the laser energy comes. For example, the SAL seeker collects laser energy 32 which is emitted by a laser target designator, reflected off the target, and travels directly to the optics 28. This laser energy is referred to herein as directly reflected laser energy 32 and is the laser energy which enables determining the true or precise target location. The SAL seeker also collects indirect laser energy 32' that is reflected off the target, and then reflected off another surface such as a surface of the projectile 2, and then travels to the optics 28. This indirectly reflected laser energy is referred to herein as glint laser energy 32' and is the laser energy which corrupts the determination of the target location. As shown in FIG. 2, the sensor array 30 of the SAL seeker 24 collect and read both the directly reflected laser energy 32 as well as the glint laser energy 32'. As can be seen in FIG. 2, once the glint laser energy 32' is reflected off the outer shell 20 of the mid-body 8 the difference in its directionality relative to the directionality of the directly reflected laser energy 32 increases. Since the glint laser energy 32' and the directly reflected laser energy 32 come from different directions, reading both laser energies 32, 32' leads to an inaccurate determination of the target location.

Figure 4:
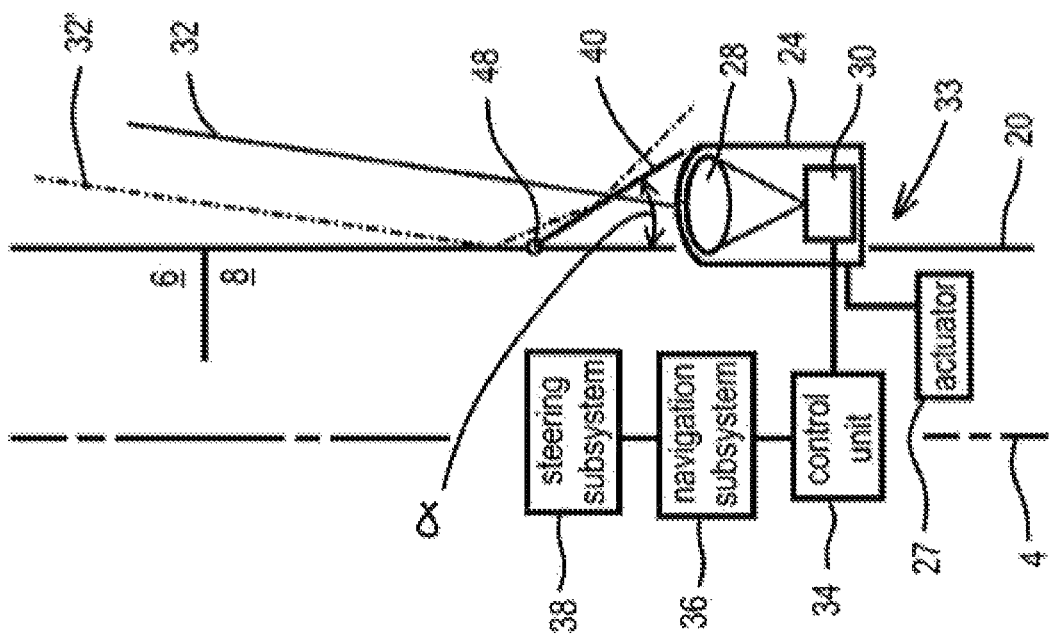
FIG. 4 is a diagrammatic view of a guidance system with the mid-body SAL seeker and glint management unit according to the description collecting laser energy which is at an angle to the projectile.

FIG. 3 shows a simplified diagrammatic section of a portion of the mid-body 8 or the projectile 2 and a SAL seeker 24 of another embodiment of the guidance system 22 which includes a glint management unit 40. The outer shell 20 of the mid-body 8 has a surface that is parallel to the longitudinal axis 4 of the projectile 2 and aligned in the direction of flight F. In this case, the SAL seeker 24 is independent of the wings 26 shown in FIG. 1. The SAL seeker 24 can be biased by an actuator 27 so as to move from a stowed position, within the outer shell 20, to a deployed position. When biased to the deployed position the SAL seeker 24 passes through an opening 33 in the outer shell 20 so as to have a forward facing FOV. FIGS. 3 and 4 diagrammatically illustrate the SAL seeker 24 in the deployed position in which the optics 28 and sensors 30 are arranged outside the outer shell 20 of the mid-body 8. The objective lens assembly or rather optics 28 can include a plurality of lenses such as an objective lens for example that defines the FOV that are configured and arranged at the leading end of the SAL seeker 24 to capture and focus directly reflected laser energy 32 on the sensors 30. The sensors 30 are generally configured to be sensitive to common wavelengths of laser energy from laser target designators such that the laser energy 32 reflected off a target. The sensors 30 of the SAL seeker 24 read and convert reflected laser energy 32 into laser data that at least is indicative of the direction from which the directly reflected laser energy 32 came. The sensors 30 transmit this laser data, via a communication interface, to a processor of flight control unit 34 for processing and/or storage. The guidance system 22 further includes navigation and steering sub-systems 36, 38 which function together to control, adjust, or correct the trajectory or flight of the projectile 2 to a selected target, based on the laser data transmitted from the SAL seeker 24.

To facilitate a more accurate determination of the location of the target, the guidance system 22 according to the disclosure comprises a glint management unit 40 that reduces or eliminates the amount of indirectly reflected laser energy 32' that is captured and focused by the optics 28. As shown in FIG. 3, the glint management units 40 are aligned in circumferential positions about the mid-body 8 that correspond to the circumferential positions at which the optics 28 are aligned. Further, with regard to the direction of flight F of the projectile 2, the glint management units 40 are arranged axially in front of the optics 28 and sensors 30 of the SAL seekers 24. The glint management unit 40, illustrated in FIG. 3, is coupled to the outer shell 20 of the mid-body 8 at a set angle α relative to the direction of travel of the projectile 2 or rather relative to the longitudinal axis 4 thereof. That is to say in other words, the glint management unit 40 has a leading end 42 that is fixed to the outer shell 20 of the mid-body 8, and a trailing end 44 that can be spaced at a distance from the outer shell 20 of the mid-body 8 by a gap. In this configuration, the optics 28 and sensors 30 of the SAL seeker 24 are at least substantially located directly behind the glint management unit 40 in the direction of travel of the projectile 2, i.e., in relation to the flow of air axially along the outer shell 20. The arrangement of the glint management unit 40 with the SAL seeker 24 at least substantially blocks the optics 28 and sensors 30 of the SAL seeker 24 from the flow of air and protects them from impact with debris or matter that may be in the flow of air.

Furthermore, as shown in FIGS. 3 and 4 the glint management unit 40 is arranged on the mid-body 8 at a set angle α relative to the outer shell 20 and thus the longitudinal axis 4. The set angle of the glint management unit 40 allows the directly reflected laser energy 32 to pass through the glint management unit 40 to the optics 28 and sensors 30, while the indirectly reflected or rather glint laser energy 32' is reflected off the glint management unit 40 away from the optics 28 and sensors 30. In other words the glint management unit 40 prevents or reduces the amount of glint laser energy 32' from being captured and focused by the optics 28 and read by the sensors 30 which as a result significantly eliminates or reduces corruption of the sensor 30 readings. By reflecting the glint laser energy 32' away from the optics 28 and sensors 30, the determination of the directionality, i.e., the direction from which the directly reflected laser energy 32 came, is more accurate and thus the determination of the target location is more accurate.

Referring to FIG. 3, the directly reflected laser energy 32 travels in a line that is at least substantially parallel to the longitudinal axis 4 of the projectile 2 or rather the travel direction of the projectile 2. The glint management unit 40 is arranged such that the directly reflected laser energy 32, which is parallel to the longitudinal axis 4, impinges the glint management unit 40 at the Brewster's angle and simply passes through the glint management unit 40 and is captured and focused by the optics 28 and read by the sensors 30 of the SAL seeker 24.

In contrast, as shown in FIG. 4, the reflected laser energy 32, 32' travels along lines that are at an angle relative to the longitudinal axis 4 of the projectile 2 or rather the travel direction of the projectile 2. With the glint management unit 40 arranged such that the ray of the Brewster's angle is parallel to the longitudinal axis 4, the directly reflected laser energy 32, which impinges the glint management unit 40 at an angle less than the Brewster's angle, passes through the glint management unit 40 and is captured and focused by the optics 28 and read by the sensors 30 of the SAL seeker 24, while the indirectly reflected laser energy 32' is reflected off the surface of leading face 46 of the outer shell 20 away from the optics 28 and the sensors 30 of the SAL seeker 24. As a result of preventing the glint laser energy 32' from being read by the sensors 30, the end determination of the location of the target is more accurate.

Preferably, the set angle α at which the glint management unit 40 is positioned on the outer shell 20 relative to the longitudinal axis 4, is such that as much of the directly reflected laser energy 32 as possible is allowed to pass through the glint management unit 40 to the optics 28 and sensors 30. At the same time, the glint management unit 40 prevents or at least minimizes the amount of glint laser energy 32' passing through to the optics 28 and sensors 30. In one embodiment the glint management unit 40 is arranged relative to the longitudinal axis 4 at a set angle α of about 24+/−0.5 degrees, if the Brewster angle is at 56.6 degrees. This would eliminate all glints greater than 0.5 to 1.5 degrees (range due to the tolerance) left of the longitudinal axis 4. In another embodiment the set angle of the glint management unit 40 is between 22 and 26 degrees. It is recognized that the set angle α at which the glint management unit 40 is arranged relative to the longitudinal axis 4 is dependent on the Brewster angle of the glint management unit 40. Since Brewster's angle varies depending on the refractive indices of the materials through which the laser energy propagates, and since the refractive index of air is generally considered to be 1.00, the Brewster's angle of the glint management unit 40, at least partially depends on light energy transmission characteristics the refractive index of the material (including optical coatings) from which the glint management unit 40 is made or formed. The light energy transmission characteristics of a material can include transparency, translucency, opacity, refractive index, diffusion factor, and translucency parameter for example. The glint management unit 40 according to the description can be made of silicate glass, acrylic glass, or any optical element within the bandpass of the sensor array and with applied optical coatings the actual Brewster's angle can be tuned for better packaging or conformance with the aerodynamics Preferably the material used to make the glint management unit 40 is a crown glass such as a borosilicate glass or rather BK7. As borosilicate glass or rather BK7 has a refractive index of approximately n=1.5168, the Brewster's angle of the glint management unit 40 is approximately 56.604 degrees. The base material can be selected for optimum bandpass at the lowest cost and optical coatings can be applied to optimize the actual cut off angle (Brewster's angle) of the designator wavelength. This approach allows for maximum flexibility between airframe aerodynamic requirements while balancing the needs of the sensor array 30. In addition, it is possible for the optical lens assembly 28 to include a bandpass filter which limits passage of light based on frequency in order to reduce background noise.

The glint management unit 40 is preferably angled relative to the longitudinal axis 4 such that the Brewster's angle of the glint management unit 40 is either parallel to the longitudinal axis 4 or the Brewster's angle of the glint management unit 40 is at a 1-2 degree angle toward the longitudinal axis. This enables directly reflected light energy 32 that is slightly angled toward the longitudinal axis 4 to pass through the glint management unit 40 (see FIG. 4) to the optics 28 and sensors 30. Preferably the Brewster's angle of the glint management unit is between 50-65 degrees so as to mitigate the impact of the glint management unit 40 on the aerodynamic profile of the projectile 2.

Since the glint management unit 40 projects or extends out from the mid-body 8 into the flow of air, it will have an aerodynamic impact on the projectile 2. To minimize its aerodynamic influence, the glint management unit 40 can have an optical coating to tune the Brewster's angle and provide environmental protection during flight, preferably on its leading face 46. Such an optical coating can alter the optical or reflective properties of the glint management unit 40 such that the glint management unit 40 need not extend into the flow of air as far as it would otherwise. In other words, the coating enables the set angle α of the glint management unit 40 relative to the longitudinal axis 4, to be reduced. This in turn, reduces the aerodynamic impact the glint management unit 40 has on the projectile 2.

With relation to the light transmitting and physical properties of the material from which the glint management unit 40 is made, it is preferred that the glint management unit 40 is made from a material that is at least substantially if not fully transparent to the directly reflected laser energy 32. Furthermore, the glint management unit 40 should be made from a material that is resilient enough to withstand the forces generally associated with such a projectile 2 including, for example, aerodynamic forces and forces experienced when launching the projectile 2.

The glint management unit 40 is sized and shaped so as to at least substantially enshroud or cover the leading face of the optics 28 in relation to the direction of travel of the projectile 2. As such, the size of the glint management unit 40 can be dependent on the size, placement and arrangement of the optics 28 as well as the set angle α of the glint management unit 40 with respect to the longitudinal axis 4 of the projectile 2. For example the further the optics 28 are arranged away from the outer shell 20, the longer the glint management unit 40 will be. Additionally, the glint management unit 40 can be formed having different shapes and/or profiles. For example the glint management unit 40 can be planar or curved and can have a polygonal, curvilinear or rounded profile. However in one preferable variation, as shown in the lateral view of the glint management unit 40 and the SAL seeker 24 according to FIG. 5, the glint management unit 40 is planar and has a rectangular profile. The planar, rectangular shape simplifies the manufacture of the glint management unit 40 and thus reduces the costs associated with the same.

It is to be appreciated that the glint management unit 40 can be fixed or pivot relative to the outer shell 20 of the mid-body 8 however, for the purposes noted below, it is preferable for the glint management unit 40 to pivot. As shown in FIGS. 3 and 4, the leading end 42 of the glint management unit 40 is connected by a pivot joint 48 to the outer shell 20 of the mid-body 8 such that the glint management unit 40 can be pivoted from a neutral position to a deployed position. FIG. 6A shows a SAL seeker 24 in a stowed position, i.e., located within the outer shell 20, and the glint management unit 40 in a neutral position, laying on or at least substantially flush with the surface of the outer shell 20 such that the glint management unit 40 has minimal aerodynamic influence on the flight of the projectile. When the SAL seeker 24 is being moved to the deployed position, as shown in FIG. 6B, the glint management unit 40 can be pivoted so as to extend radially outward from the outer shell 20 and, in this position, the glint management unit 40 shields the optics 28 of the SAL seeker 24. The glint management unit 40 can be pivoted by a dedicated actuator (not shown) or more preferably it is pivoted by contact with the SAL seeker 24 as the SAL seeker 24 is moved, by the actuator 27, from the stowed position to the deployed position. To facilitate pivoting of the glint management unit 40 by the SAL seeker 24 in this manner, the glint management unit 40 is positioned on the outer shell 20 such that the trailing end 44 the glint management unit 40 overlaps the leading end of the opening 33 in the outer shell 20. In this case, dedicated actuators for biasing the glint management units 40 are not necessary.

As briefly described above, the SAL seekers 24 can be mounted on the wings of the projectile 2. FIG. 7 shows a wing 26 in a deployed position relative to the projectile 2, in which the SAL seeker 24 situated in the air stream adjacent the exterior surface of the outer shell 20 of the mid-body 8. In this case, a tubular extension 50 is either integrally formed with or coupled to the SAL seeker 24, specifically the nacelle of the SAL seeker 24. The glint management unit 40 is secured to the leading end of the extension 50 such that the Brewster's angle is parallel to the longitudinal axis 4 of the projectile 2 so as to reflect glint laser energy 32' away from the optics 28 and sensors 30 of the SAL seeker 24.

Figure 8B:
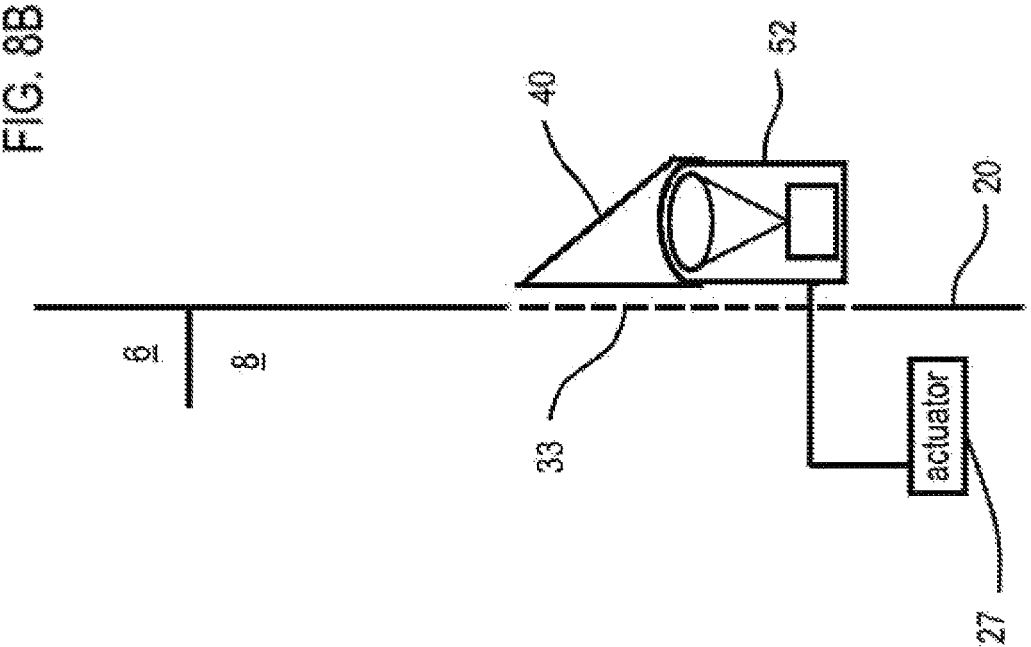
FIGS. 8A and 8B are diagrammatic views showing a variation of a mid-body SAL seeker and glint management unit according to the description in a stowed and a deployed position.
Figure 8A:
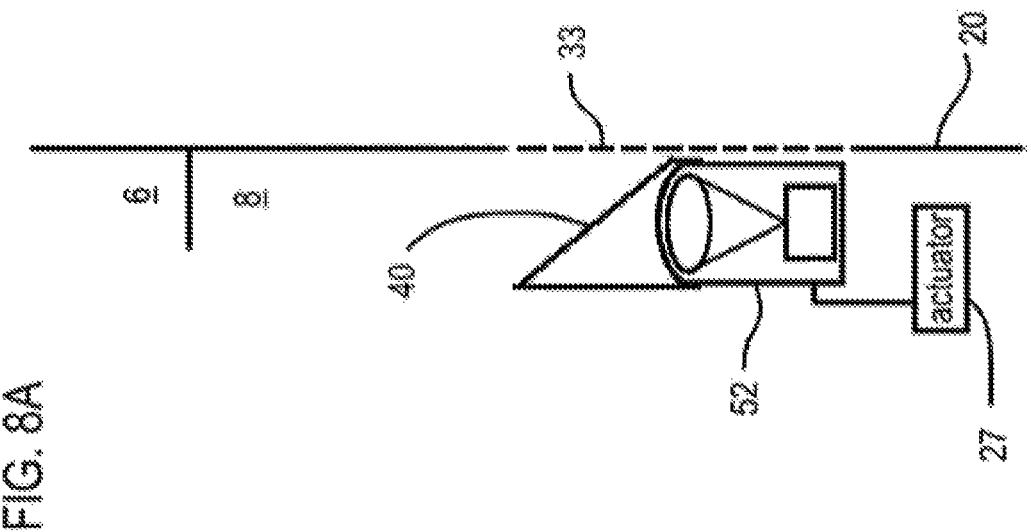

In another configuration shown in FIGS. 8A and 8B, the optics 28, sensors 30 and glint management unit 40 are united in a nacelle 52 as a complete assembly. In this configuration the nacelle 52 can moved by an actuator 27 through an opening 33 in the projectile 2 from a stowed position in the interior of the projectile 2, or preferably within the mid-body 8 (see FIG. 8A) to a deployed position along an exterior side of the outer shell 20 of the mid-body 8. As a single unit, alignment of the optics 28, sensor array 30 and the glint management unit 40 relative to the longitudinal axis 4 can be ensured.

Figure 9:
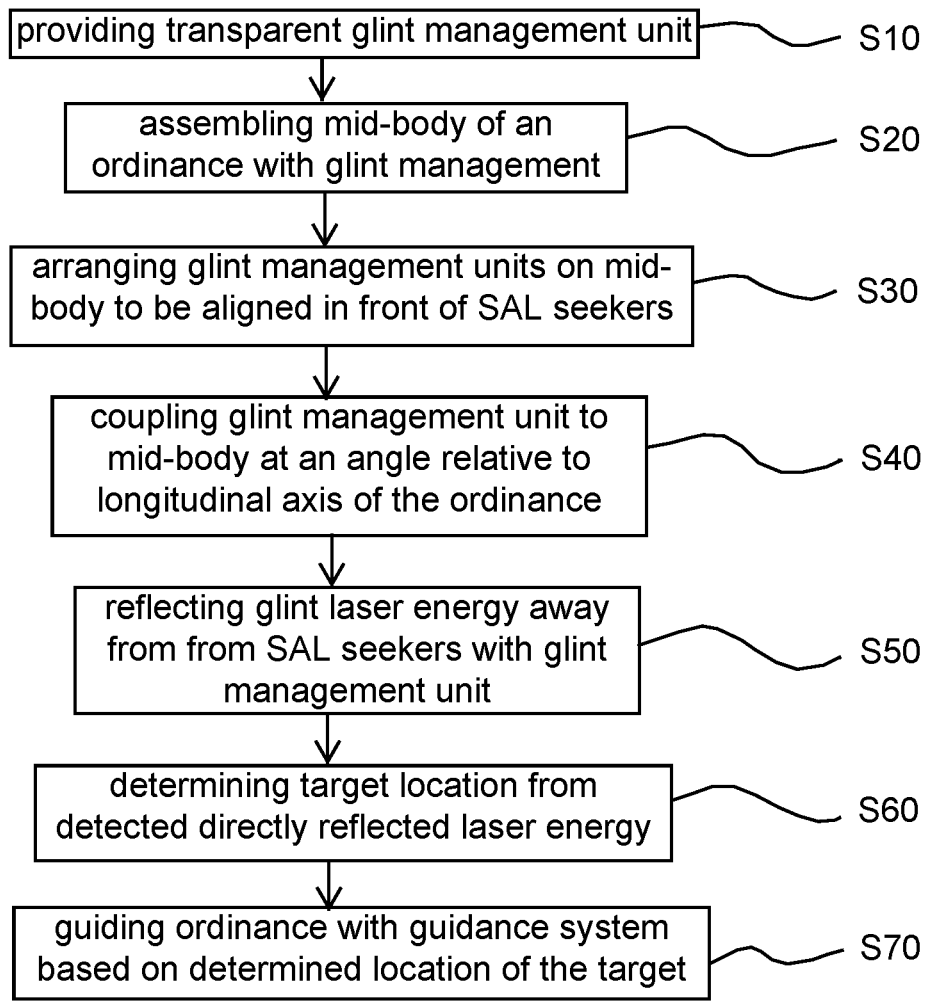
FIG. 9 illustrates a method of accurately determining a location of a target and guiding a projectile to the target.

With reference to FIG. 9, the guidance system 22 with the mid-body SAL seeker 24 and having the glint management unit 40, as described above, operate to more accurately determine the location of a target and guide the projectile in flight to the target. Initially, one or more glint management units 40 are provided S10 which are at least substantially transparent to laser energy 32. The mid-body 8 of the projectile 2 is assembled S20 with glint management units 40 in which the glint management units 40 are arranged S30 on the mid-body 8 so as to be aligned directly in front of the SAL-seekers 24, relative to the direction of flight F of the projectile 2. Then the glint management units 40 are coupled S40 to the mid-body 8 such that when the SAL seekers 24 are arranged in a deployed position, the glint management units 40 are aligned at a set angle relative to the longitudinal axis 4 or rather the surface of the outer shell 20 of the mid-body 8. The glint management units 40 being configured S10 such that, when aligned at the set angle relative to the longitudinal axis, they allow directly reflected laser energy 32 to pass to the optics 28 of the SAL seeker 24 and reflect S50 glint laser energy 32' away from, or rather prevent glint laser energy 32' passing to the optics 28 of the SAL seeker 24 which results in minimizing corruption of the directionality of the laser energy and an increased the accuracy of determination of the target location. Based on the directly reflected laser energy 32 passed to the optics 28, the location of the target is then determined S50 by control unit 34. Finally, depending of the determined target location, the projectile 2 is guided S60 in flight by the guidance system 22 to the target. The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed:

1. A guidance system for a projectile comprising:
an objective lens assembly and a sensor array, the objective lens assembly being configured to capture and focus light energy on the sensor array, and the sensor array being configured to detect the light energy and transmit signals corresponding to the detected light energy;
a flight control unit communicating with the sensor array for receiving the signals corresponding to the detected light energy, the flight control unit determining at least a directionality of the detected light energy; and
a glint management unit, in a deployed position, being aligned in front of and coaxially with the objective lens assembly relative to a direction of a flight of the projectile, the glint management unit being arranged at a set angle relative to a longitudinal axis of the projectile such that glint light energy passing toward the objective lens assembly is reflected away from the objective lens assembly, wherein the glint management unit is arranged at the set angle relative to the longitudinal axis of the projectile such that a Brewster's angle of the glint management unit is parallel to the longitudinal axis.

2. The guidance system according to claim 1, wherein the glint management unit is arranged at the set angle such that directly reflected light energy passes through the glint management unit to the objective lens assembly and the glint light energy is reflected away from the objective lens assembly.

3. The guidance system according to claim 1, wherein a leading end of the glint management unit is fixed to an outer surface of the projectile such that the glint management unit is pivotable from a neutral position in which the glint management unit is substantially flush with the outer surface to the deployed position in which a trailing end of the glint management unit is spaced away from the outer surface by a gap.

4. The guidance system according to claim 3, wherein the objective lens assembly contacts the trailing end of the glint management unit and biases the glint management unit from the neutral position to the deployed position.

5. The guidance system according to claim 1, wherein the objective lens assembly, the sensor array and the glint management unit are assembled in a nacelle which is movable by an actuator from a stowed position in an interior of the projectile to a deployed position outside the projectile.

6. The guidance system according to claim 1, wherein the flight control unit transmits control signals to a navigation subsystem and a steering subsystem to control flight of the projectile toward the target based on the determined directionality of the detected light energy.

7. The guidance system according to claim 1, wherein the objective lens assembly comprises an objective lens that defines the field of view of the objective lens assembly, and a bandpass filter to reduce background noise, the sensor array is either a digital sensor array or an analog sensor array.

8. The guidance system according to claim 1, wherein the glint management unit comprises an optical coating that alters light energy transmission characteristics of the glint management unit and the set angle at which the directly reflected light energy passes through the glint management unit to the objective lens assembly.

9. The guidance system according to claim 1, wherein the glint management unit has a Brewster's angle of between 50 to 65 degrees and is arranged at the set angle such that a line parallel to the longitudinal axis is 1 to 2 degrees prior to the Brewster's angle.

10. The guidance system according to claim 1, wherein the objective lens assembly and the sensor array form a semi-active laser seeker that is arranged on a mid-body of the projectile and the light energy that is captured and focused on the sensor array is laser energy that is reflected off the target.

11. The guidance system according to claim 1, wherein the objective lens assembly and the sensor array form a semi-active laser seeker that is mounted on a wing of the projectile and the glint management unit is fixed to the semi-active laser seeker by an extension which extends axially ahead of the semi-active laser seeker relative to a direction of flight of the projectile.

12. A method of determining a location of a target and guiding a projectile to the target, the method comprising
providing one or more glint management units that are at least substantially transparent to laser energy;
arranging the glint management units on the projectile aligned directly in front of semi-active laser seekers of the projectile relative to a direction of flight of the projectile;
coupling the glint management units to the projectile at a set angle relative to a longitudinal axis of the projectile, wherein the glint management unit is arranged at the set angle relative to the longitudinal axis of the projectile such that a Brewster's angle of the glint management unit is parallel to the longitudinal axis;
reflecting, with the glint management units, glint laser energy away from the semi-active laser seekers and passing directly reflected laser energy to the semi-active laser seekers;
determining with a flight control unit the location of the target from the directly reflected laser energy passed to the semi-active laser seekers; and
guiding the projectile in flight, with a guidance system of the projectile, based on the determined location of the target.

13. A guidance system for a projectile, comprising:
an objective lens assembly and a sensor array, the objective lens assembly being configured to capture and focus light energy on the sensor array, and the sensor array being configured to detect the light energy and transmit signals corresponding to the detected light energy;
a flight control unit communicating with the sensor array for receiving the signals corresponding to the detected light energy, the flight control unit determining at least a directionality of the detected light energy; and
a glint management unit, in a deployed position, being aligned in front of and coaxially with the objective lens assembly relative to a direction of a flight of the projectile, the glint management unit being arranged at a set angle relative to a longitudinal axis of the projectile such that glint light energy passing toward the objective lens assembly is reflected away from the objective lens assembly;
wherein the objective lens assembly, the sensor array and the glint management unit are assembled in a nacelle which is movable by an actuator from a stowed position in an interior of the projectile to a deployed position outside the projectile.

* * * * *